Figure 4:
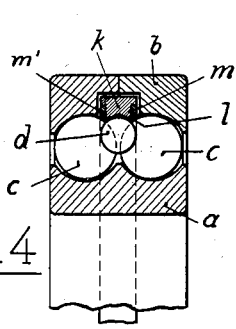

Jan. 15, 1935. P. BRÜHL ET AL 1,988,070

ANTIFRICTION BEARING

Filed Aug. 10, 1932

P. Brühl
F. Neugart
INVENTORS

By: Marks & Clark
Attys.

Patented Jan. 15, 1935

1,988,070

UNITED STATES PATENT OFFICE 1,988,070

ANTIFRICTION BEARING

Paul Brühl, Berlin-Lichtenberg, and Franz Neugart, Berlin-Charlottenburg, Germany, assignors to Max Staub, Calcutta, British India Application August 10, 1932, Serial No. 628,250
In Germany August 14, 1931

3 Claims. (Cl. 308—200)

Our invention relates to antifriction bearings, and more particularly to bearings with inner and outer race members, a plurality of raceways between them, antifriction bearing members arranged in a row in each raceway, antifriction spacing members arranged intermediate the bearing members, and a guide or tension ring for the spacing members which has lateral shoulders for guiding the antifriction bearing members and forcing them inwardly.

The shoulders extend close up to the bearing members and may get into cantact with them which results in scratching of the bearing members or in seizing of the bearing members with the shoulders, particularly if the bearing is under heavy load.

It is an object of our invention to so design a bearing of this type that damage to the bearing members is prevented if they get into contact with the shoulders.

To this end, we make the shoulders and the bearing members of materials which in contact with each other exert small frictional resistance.

Usually, the guide or tension ring or its shoulders are made of the same material, for instance the steel known as "ball steel", with about 1% chromium. According to our invention, either the guide ring or its shoulders, or the antifriction bearing members, are made of a material which possesses a particularly small sliding friction in contact with ball steel.

With a guide ring, or shoulders, or bearing members designed on these lines, scratching and seizing are prevented and the members in contact are polished, resulting in a very small frictional resistance.

Our invention may be reduced to practice in various ways. Thus, the guide ring, or its shoulders, may be made of a material which, in contact with the steel of the antifriction bearing members, exerts small frictional sliding resistance. Such materials are, for instance, high-chromium or high-tungsten steel, nitrated steel, i. e. steel hardened in a nitrogen atmosphere, nickel or nickel aluminium bronze, beryllium bronze, etc. High-chromium steel with, say, 13% chromium, or high-tungsten steel, or nitrated steel, is particularly advantageous because steel of these kinds is very hard and has a very dense structure so that it can be given a very high polish and the sliding friction is reduced to the elimination of scratching or seizing.

Conversely, instead of making the guide or tension ring, or its shoulders, of a material having special properties, we may make it of the usual ball steel or the like, and make the bearing members of the special material, such as high-chromium or tungsten steel, nitrated steel, etc.

Bronze has a very small frictional sliding resistance if cooperating with steel, and a bronze ring has the further advantage that the bearing members polish and grind the shoulders to their own shape, spherical in the case of balls.

Another possibility is coating the guide ring, which in this case may be of any material, with a material whose frictional resistance is small in contact with the antifriction members, for instance, brass which is preferably applied by electro-deposition.

In the accompanying drawing, several bearings embodying our invention are illustrated by way of example.

In the drawing

Figure 3:
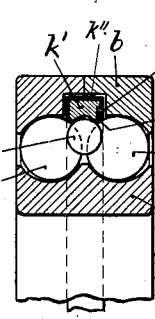
Figure 2:
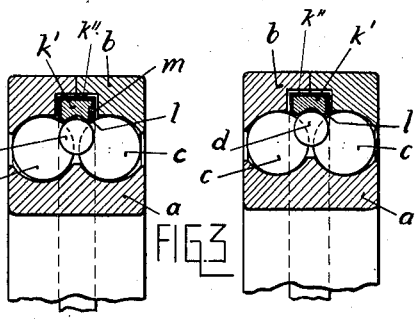
Figure 5:
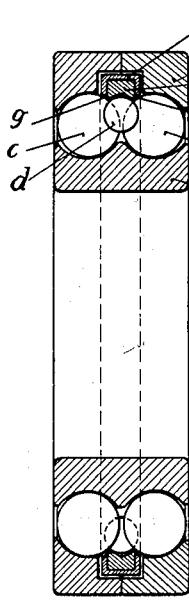
Figure 6:
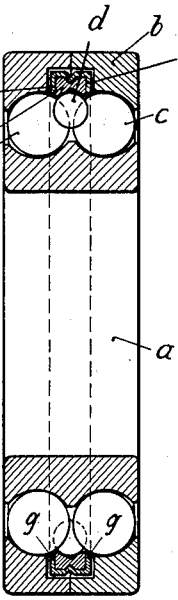
Figure 7:
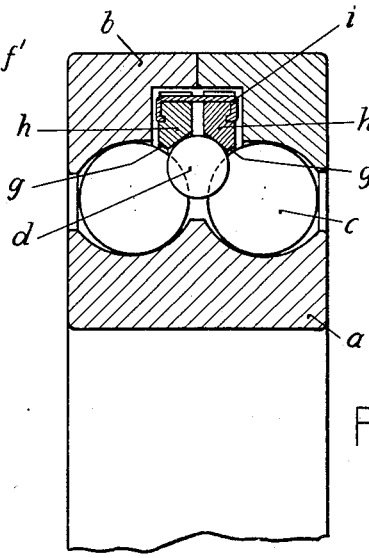
Figure 1:
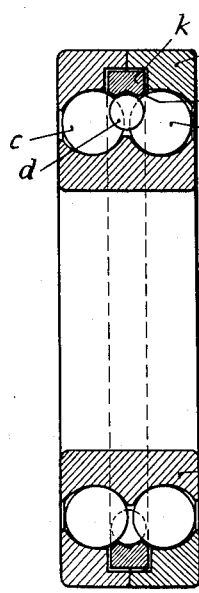
Figures 8, 9:
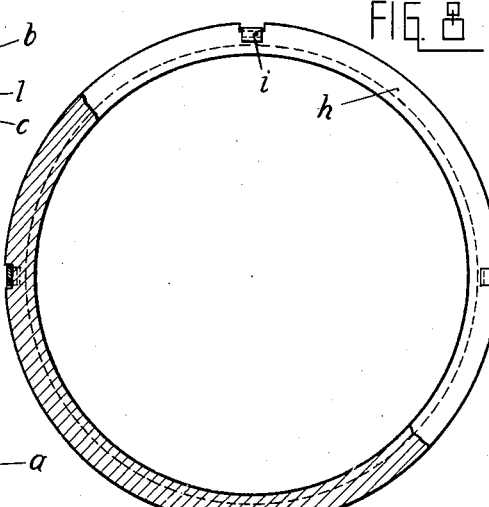

Fig. 1 is an axial section of a ball bearing with a guide or tension ring of special material, Fig. 2 is an axial section of the upper portion of a ball bearing with a coated guide or tension ring, Fig. 3 is an axial section of the upper portion of a ball bearing in which one of the shoulders of the guide ring is made of special material, Fig. 4 shows a cage having two shoulders of special material, Fig. 5 is an axial section of a ball bearing with shoulders formed by the flanges of a channel-section ring, Fig. 6 shows two angle-section rings instead of the channel, Fig. 7 is an axial section of the upper portion of a ball bearing with a divided guide ring, Fig. 8 is a partly sectional elevation, and Fig. 9 is an end elevation, of the divided guide ring.

Referring now to the drawing, and first to Fig. 1, $a$ is the inner, and $b$ is the divided outer race member, whose parts are held assembled by suitable means, not shown. The usual raceways are formed in the race members for the reception of two rows of balls $c, c, d$ are spacing balls of smaller diameter than the bearing balls $c, c$, which are arranged intermediate the two rows of bearing balls in the usual manner. $k$ designates a guide or tension ring, and $l$ are its lateral shoulders which guide the balls and are preferably made concave so as to fit the balls $c, c$ if they make contact with the shoulders. The shoulders extend closely to the balls $c, c$ when the ring $k$ is in its normal or centered position. The ring $k$ is supposed to be of special material, such as high-chromium steel, and the balls c, c are supposed to be of low-chromium or ball steel. It is to be noted that the ring k acts to guide the spacing balls d and forces them inwardly.

As mentioned, the balls might be of the special material, and the ring k of normal material.

Referring now to Fig. 2, the guide or tension ring k' may be of any suitable material, and is supposed to be of the same material as the balls c, c but is coated with a layer k'' which may be brass or any other suitable material, on its body and shoulders l', preferably by electrodeposition. The balls c, c, if they get into contact with the shoulders l', cooperate with the layer k'' and not with the steel of the ring k'.

Referring now to Fig. 3, the ring k' is coated, like the cage in Fig. 2, but one of its shoulders is formed by a ring m which is secured to the cage by any suitable means, or hammered or rolled into the ring. The ring m is of special material, say nickel-aluminium bronze, with a small frictional sliding resistance on the balls c, c.

Fig. 4 shows an uncoated ring k with two shoulders m and m'.

Referring to Fig. 5, the ring is built up from a body e, with a raceway for the spacing balls d, and a channel-section ring f whose flanges form the shoulders g, g. The shoulders may be concave to fit the balls. The ring body e may be of normal steel and the ring f may be of special steel, bronze or the like. It may be secured on the body e in any suitable manner, for instance, by pressing.

Fig. 6 shows the ring divided into two angle sections f' and f'' whose outer ends form the shoulders g, g while their inner ends are forged down into a groove or other depression in the outer face of the body e.

Referring now to Figs. 7, 8 and 9, the ring is subdivided into two sections h and h', each bearing on the spacing balls c and having a shoulder g, as described. The two ring sections h and h' are connected by resilient means, here shown as brackets or laminated springs i which are embedded in grooves of the ring sections h, h', as shown in Fig. 8. Any number of springs i may be provided, four being shown by way of example in Figs. 8 and 9. The flanges of the brackets i engage in grooves or depressions in the sides of ring sections h, h'.

By suitably designing the springs i, or other resilient means, the ring sections h, h' are applied to the spacing balls d with an exactly predetermined force so that the balls are held without play also on the unloaded side of the bearing. The pressure of the springs i must not be too strong because this might apply the shoulders g, g to the bearing balls, c, c. If the pressure of the springs oversteps a certain limit, the ring sections h, h' tend to spread apart and to move the shoulders g, g into engagement with the bearing balls c, c. The force exerted by the springs i must be so determined that on the one hand the spacing balls are held firmly while on the other hand the shoulders are not applied to the bearing balls.

Dividing the guide or tension ring has the other advantage that both shoulders g may be relied on to contact with the bearing balls c, c if contact occurs for centering the ring. One-sided engagement is undesirable because the full load bears on one shoulder while the load is equally distributed by a divided ring.

The ring sections h, h' or the bearing balls, may be made of special material, as described.

The body e in Fig. 5 might also be divided into two ring sections, as described with reference to Figs. 7, 8 and 9, which are applied to the spacing balls d by the channel section f. Preferably, the channel section is made resilient, like the spring brackets i in Figs. 7, 8 and 9.

We claim:

1. An antifriction bearing comprising inner and outer race members, with a plurality of raceways between them, antifriction bearing members arranged in a row in each of said raceways, antifriction spacing members intermediate the bearing members, a guide ring on said spacing members, lateral centering shoulders on said guide ring adapted to bear on said bearing members, and a galvanic deposit of brass on one of said shoulders and the other of said shoulders consisting of bronze material which presents less frictional sliding resistance to the bearing members than the material of the bearing members would present.

2. An antifriction bearing comprising inner and outer race members, with a plurality of raceways between them, antifriction bearing members arranged in a row in each of said raceways, antifriction spacing members intermediate the bearing members, a guide ring on said spacing members, lateral shoulders on said guide ring adapted to bear on said bearing members, and a galvanic deposit of brass on said guide ring which presents less frictional sliding resistance to the bearing members than the material of the bearing members would present.

3. An antifriction bearing comprising inner and outer race members, with a plurality of raceways between them, antifriction bearing members arranged in a row in each of said raceways, antifriction spacing members intermediate the bearing members, a guide ring on said spacing members consisting of a pair of sections, each with a shoulder adapted to bear on said bearing members, said ring sections being made of a material which presents less frictional resistance to the bearing members than the material of the bearing members would present, and resilient means for applying said ring sections to opposite sides of said spacing members.

PAUL BRÜHL.
FRANZ NEUGART.